United States Patent [19]
Livingston

[11] 4,306,660
[45] Dec. 22, 1981

[54] BICYCLE STAND

[76] Inventor: David E. Livingston, 359 NE. Rennie St., Corvallis, Oreg. 97330

[21] Appl. No.: 712,021

[22] Filed: Aug. 5, 1976

Related U.S. Application Data

[63] Continuation-in-part of Ser. No. 423,009, Dec. 10, 1973, abandoned.

[51] Int. Cl.³ .......................... A47F 7/00; B62H 3/04
[52] U.S. Cl. .......................................... 211/20; 211/5; 211/22; 70/235
[58] Field of Search .................... 211/5, 17, 18, 19, 20, 211/21, 22, 23, 24; 70/233, 234, 235

[56] References Cited

U.S. PATENT DOCUMENTS

| | | | |
|---|---|---|---|
| 369,494 | 9/1887 | Bailey | 211/20 |
| 495,210 | 4/1893 | Smead | 211/20 |
| 557,470 | 3/1896 | Young | 211/20 |
| 614,431 | 11/1898 | Austin | 70/234 |
| 1,301,797 | 4/1919 | Ziegler | 211/24 |
| 2,806,605 | 9/1957 | Loveland | 211/22 |
| 3,785,500 | 4/1972 | Kennelly | 211/5 |

FOREIGN PATENT DOCUMENTS

| | | | |
|---|---|---|---|
| 1097303 | 1/1961 | Fed. Rep. of Germany | 211/17 |
| 888336 | 9/1943 | France | 211/20 |
| 31266 | 6/1933 | Netherlands | 211/20 |
| 88377 | 1/1937 | Sweden | 211/22 |
| 119001 | 6/1947 | Sweden | 211/24 |
| 212317 | 11/1940 | Switzerland | 211/20 |
| 220387 | 3/1942 | Switzerland | 211/19 |
| 24052 | of 1895 | United Kingdom | 211/22 |
| 7807 | of 1898 | United Kingdom | 211/22 |

*Primary Examiner*—Thomas J. Holko
*Attorney, Agent, or Firm*—Klarquist, Sparkman et al.

[57] ABSTRACT

A bicycle stand or rack is of either open framework or solid construction and has a vertically inclined hub support surface for supporting a bicycle by leaning a projecting hub portion of one wheel against such surface. Portions of the stand provide stops to prevent the wheel from rolling forward and backward from the stall space, from sliding from the hub-supporting surface and from twisting with respect to the bicycle frame. The stand may be made in modular sections for use singly to support one bicycle or in multiples to support several bicycles. The stand may also be provided with a flattened top portion to provide a seat for pedestrians.

32 Claims, 12 Drawing Figures

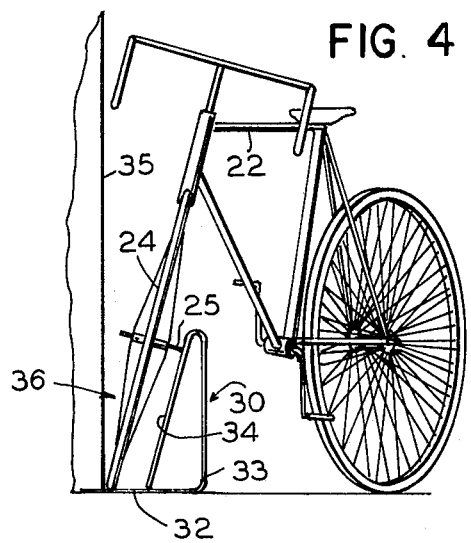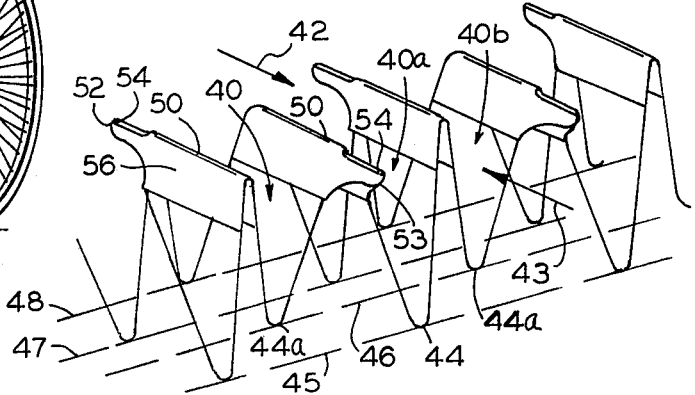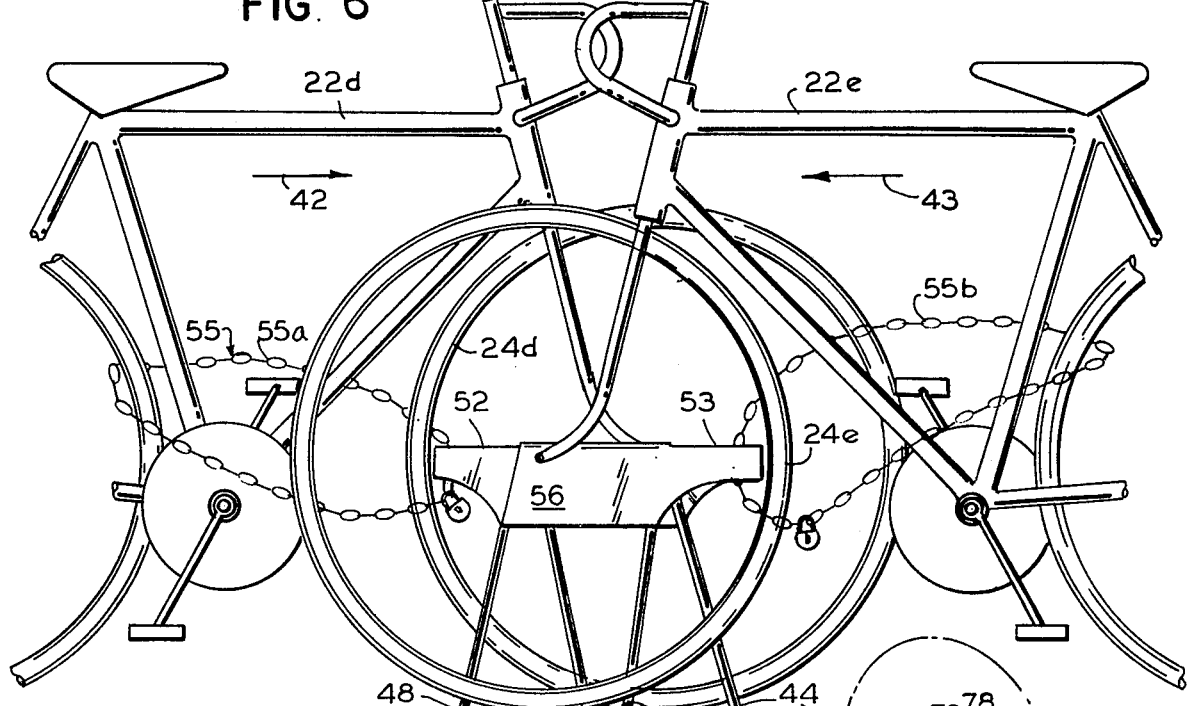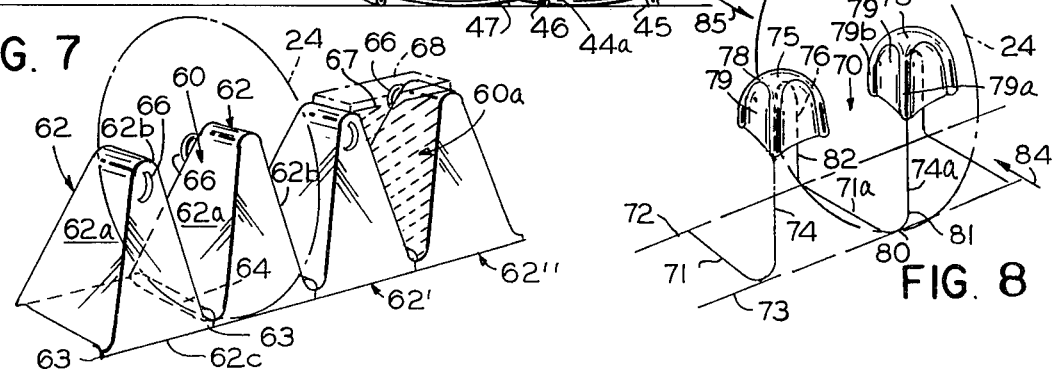

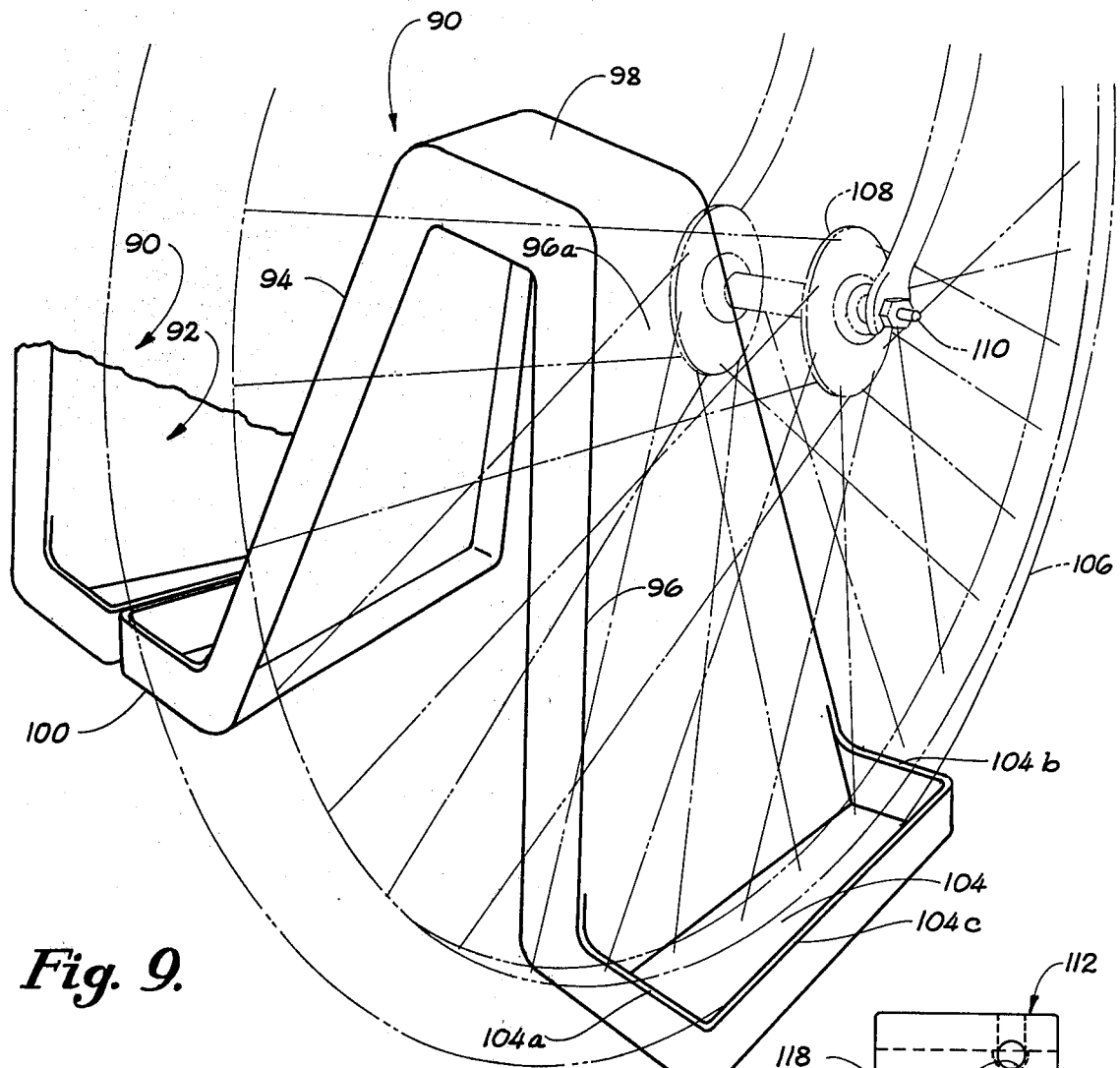
Fig. 9.
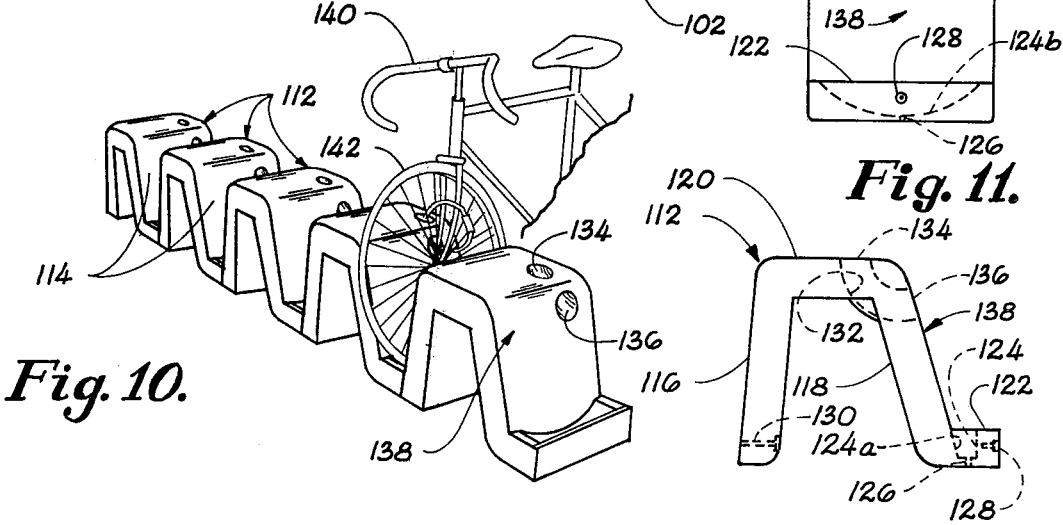
Fig. 10.
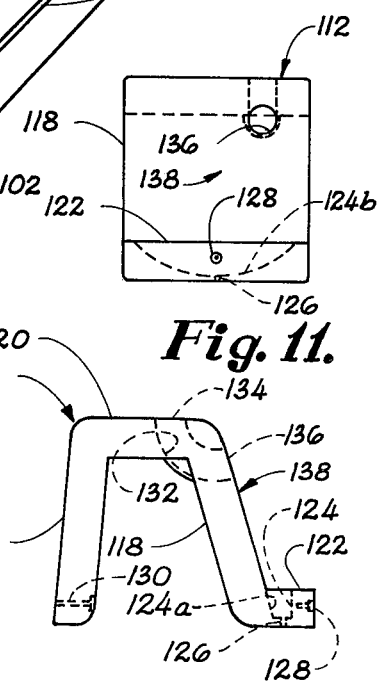
Fig. 11.
Fig. 12.

BICYCLE STAND

This application is a continuation-in-part of my prior application Ser. No. 423,009, filed Dec. 10, 1973. now abandoned.

BACKGROUND OF THE INVENTION

1. Field of the Invention

The present invention relates to a bicycle stand for supporting a bicycle in a generally upright position.

2. Description of the Prior Art

Many different types of bicycle racks have been suggested. However, several defects are common to most. First, most prior racks occupy an excessive amount of space for their capacity. Second, most prior racks are expensive to manufacture because of their complex designs. Third, many prior racks are unattractive and therefore potential customers are reluctant to purchase them for use by cyclists. Fourth, many prior racks can damage the bicycle and therefore cyclists are reluctant to use them. For example, many prior racks support a wheel of the bicycle in such a way, as by wedging, that if someone or something should fall against the bicycle while in the rack, the rack-supported wheel can be bent out of shape. Fifth, some prior racks require that the bicycle be lifted into and out of the rack, and thus are difficult and inconvenient to use. Sixth, many prior racks will not accomodate bicycles of greatly varying wheel diameters or tire widths. Seventh, most prior racks do not provide means whereby all three major parts of a bicycle, namely the two wheels and the frame, can be chained to the rack to prevent theft of one or more of such parts. Finally, many prior racks are also difficult to maintain and keep clean because of their complex designs.

Examples of prior art include the following:

Dutch Pat. No. 31,266 discloses a bicycle rack of open frame construction which supports a bicycle in a vertical position by supporting the spokes and rim of one wheel on both sides of the wheel below the hub against the open frame.

U.S. Pat. No. 2,806,605 discloses a bicycle rack of open frame construction which supports a bicycle in a vertical position by suspending one wheel in an elevated position from its hub bolt projections on both sides of the wheel.

U.S. Pat. No. 369,494 discloses a bicycle rack which supports an obsolete type of bicycle in an upstanding position by hooking the crank on one wheel about an upright post while placing the lower end of the wheel in a wheel well of a base stand.

Swiss Pat. No. 220,387 discloses a bicycle rack which supports a bicycle in an upright but slightly tilted position by inserting a forward rim portion of the wheel in an inclined slot having parallel sides.

British Pat. No. 24,052 discloses a bicycle rack which supports a bicycle in an elevated vertical position by suspending both wheels of the bicycle by their hub bolt projections on opposite sides of the wheel in longitudinally aligned and interconnected stalls.

U.S. Pat. No. 557,470 discloses a bicycle rack of open frame construction which supports a bicycle in a vertical position by wedging the top and bottom of the rim of one wheel within generally diamond-shaped slots.

Swiss Pat. No. 212,317 discloses a bicycle rack which supports a bicycle in a generally upright position by insertion of the rim and spoke portions of one wheel below and forwardly of its hub into an inclined narrow slot with parallel sidewalls formed in a solid block.

Accordingly, there is a need for an improved bicycle rack that eliminates or minimizes the foregoing disadvantages of most prior racks.

SUMMARY OF THE INVENTION

In accordance with the present invention, a bicycle stand provides a vertically inclined wheel hub support surface at hub height to the wheel so that a hub portion of the wheel of a bicycle can be leaned against such surface to support the entire bicycle in a nearly upright position.

In one preferred form, the stand defines an open-ended generally vee-shaped stall space with the support surface forming a portion of one side of the vee. Proper support for the wheel is achieved by providing stop means, usually near ground level, which prevent the wheel from slipping sideways or falling over on its side, from rolling forward or backward from the stall space, and in case of a steerable front wheel, from twisting out of a preset relationship with respect to the frame.

In another preferred form the stand is formed in separate modular sections, each including at least one inclined hub support surface and one set of wheel stops. The sections can thus be used either by themselves to support a bicycle or in multiples side-by-side to support several bicycles.

Primary features of the invention include:

(1) The vertical angle of one side of the vee stall may be greater than that of the other so that multiple bicycles lean in the stand in one predetermined direction, thereby minimizing space requirements and enhancing the appearance of the rack when in use.

(2) The stand provides a non-damaging support by supporting the front wheel of the bicycle at hub height without touching the wheel spokes, any painted portion of the bicycle or any other portion which may be harmed.

(3) The stand provides a positive support for bicycles with a minimal use of structural support members by supporting the wheel at hub level and by using the hub axle bolt and tire to support the load.

(4) The stand provides easy parking with a minimal effort by simply rolling one wheel of the bicycle into a stall and leaning it against one inclined side surface of the stall.

(5) The stand is designed to occupy minimal space by being relatively short in height and narrow in width. Its modular design enables it to be made or assembled in any desired length depending on the desired capacity of the rack.

(6) The stand can be designed to hold all sizes of bicycles by extending the inclined supporting side surfaces of the stalls to within a short distance of ground level and by making the narrow lower portions of the stalls wide enough to accomodate the widest balloon-type tires.

(7) The stand has a great design versatility in that it can be designed to accomodate benches, street lights, or even plantings, thereby optimizing the use of available ground space and enhancing the attractiveness of the rack. The stand can also be designed as a two-way rack to accomodate bikes inserted into closely spaced-apart stalls from opposite directions for maximum capacity per length of rack or as a one-way rack with greater spacing between stalls, enabling the use of benches between stalls and the arrangement of the rack along curves, at angles or in a circle.

(8) The stand may be provided with a locking means at an optimum position for securing by chain or cable the three major parts of the bicycle.

(9) The stand minimizes the amount of paved space required because the front edge of the stand extends just slightly forward of the point at which the supported wheel touches the ground.

(10) Stand maintenance, especially the jarring loose of the stand from its anchor bolts, is minimized by the placement of both wheel stops at ground level.

(11) Cleaning of the grounds about the stand is facilitated because of the few structural members actually resting on the ground.

(12) The stand is provided with exceptional strength for its weight through its basic pyramidal or inverted vee design form, and in the open framework form, because of the short lengths of unsupported rod or tubular framework and the absence of bolted and movable parts.

(13) The stand intrudes to a minimum extent into pedestrian and other spaces when the stand is empty because it supports bicycles by only one wheel.

(14) All variations of the stand can be made in an economical modular design which simplifies manufacture in a wide range of lengths and thus capacities.

(15) The stand has a generally pleasing appearance in all forms because of its regular, geometric shape. Even in use the stand is pleasing visually because all bicycles are caused to lean in the same direction.

(16) The stand is designed for economical manufacture using a wide variety of inexpensive materials including metal rod or tubing, sheet metal, concrete, fiberglass and other plastics.

(17) The stand is designed for manufacturing versatility in that it can be produced by any stamping, casting, welding or forming process depending on the material selected for use. The basic design is versatile enough to be incorporated into various architectural schemes, using different materials and configurations.

The foregoing objects, features and advantages of the present invention will become more apparent from the following detailed description which proceeds with reference to the accompanying drawing.

BRIEF DESCRIPTION OF DRAWINGS

In the drawings:

FIG. 4 is a front view of a modified form of stand made of sheet metal in accordance with the invention for use in conjunction with a vertical wall;

FIG. 5 is a perspective schematic diagram of another modified form of stand incorporating bike-locking loops;

FIG. 6 is an end view of the stand of FIG. 5 on an enlarged scale showing a method of locking bicycles in the stand;

FIG. 7 is a perspective view of another modified form of the invention using concrete blocks;

FIG. 8 is a perspective schematic diagram of another, more simplified form of the invention using metal rods;

FIG. 9 is a perspective view of one module and part of another of a modular molded plastic form of the stand;

FIG. 10 is a perspective view of several modules of a modular form of the stand made of cast concrete;

FIG. 11 is a side elevational view of one module of the stand of FIG. 10; and

FIG. 12 is an end elevational view of the module of FIG. 11.

DETAILED DESCRIPTION

FIG. 1 Form

Figure 1:
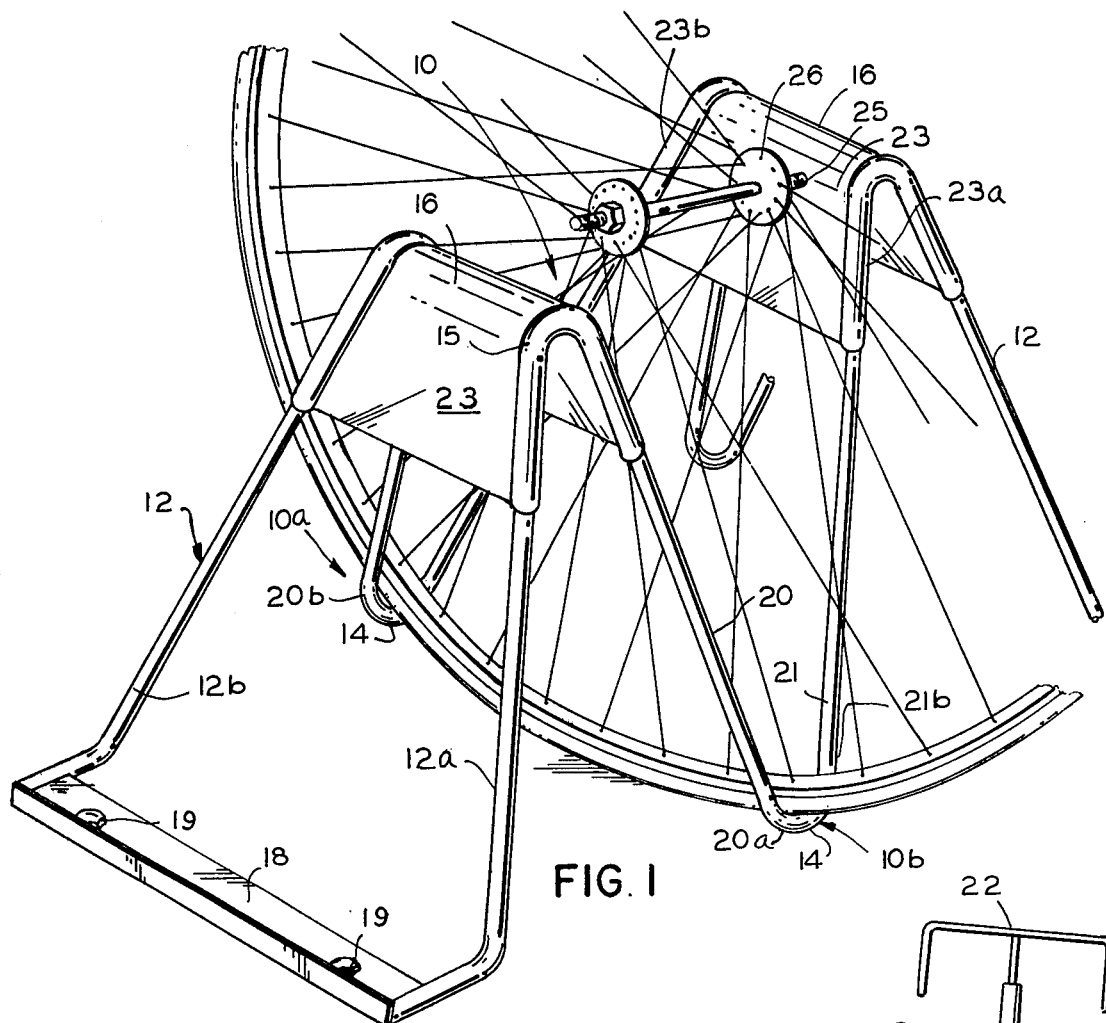
FIG. 1 is a perspective view of a portion of a bicycle stand formed of metal rod in accordance with the invention.
Figure 2:
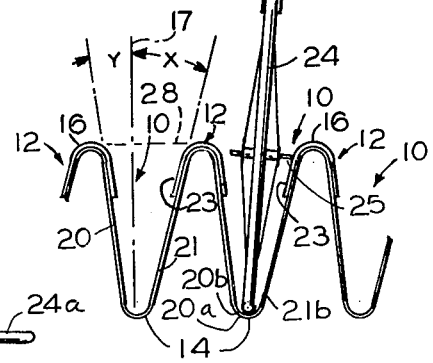
FIG. 2 is a front view of the stand of FIG. 1 on a small scale.
Figure 3:
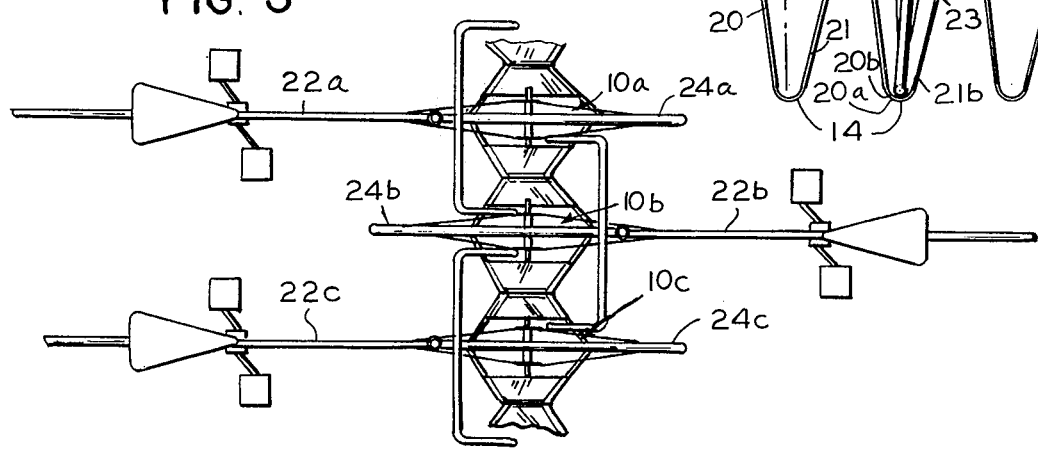
FIG. 3 is a plan view of the stand of FIG. 2 occupied by three bicycles instead of one.

Referring to the form of the stand or rack shown in FIGS. 1-3, the rack of the invention comprises a series of generally vee-shaped stall spaces 10 open at both ends and defined by a stall structural means of open frame construction comprising a series of generally inverted vee- or pyramidal-shaped stall sections 12 joined together at intersecting rounded base portions 14 to define the narrow portion of the vee stall. Each stall section includes a front frame portion 12a and a rear frame portion 12b, each formed by a pair of upwardly converging legs formed of metal rod and joined at their upper ends at a rounded apex 15. The front and rear legs 12a, 12b of each stall section are joined together at their upper ends by a metal or plastic cap or plate 16 to form the rigid pyramidal section. The front legs and the rear legs of successive stall sections can be formed from continuous strips, rods, or tubing. The front and rear end legs at each end of the rack are joined together by a base member 18 which may be anchored as by anchor bolts 19 to a paved ground surface.

As will be apparent from FIG. 2, one corresponding side portion 21 of each of the vee stalls 10 formed by the adjoining front and rear legs of adjacent stall sections extends upwardly and outwardly from the base of the stall space at a greater vertical angle than the other side portion 20 relative to a vertical plane 17 within the stall space. In FIG. 2 the vertical angle x between side portion 21 and vertical plane 17 is about 13 degrees whereas the vertical angle y between opposite side portion 20 and the same vertical plane is about 7 degrees. However, it will be appreciated that these angles can be varied within substantial limits. For example, as shown in FIG. 4 where a modified form of the rack of the invention cooperates with a vertical wall of a building to form a vee stall, the smallest angle of the vee is actually 0 degrees. The greater vertical angle of the vee stall for practical purposes, however, should preferably be no greater than about 30 degrees and will usually be considerably less than this in order to maintain the bicycles as nearly vertical as possible while ensuring that they will lean in one predetermined direction.

The cap 16 of each stall section extends downwardly along each side portion 20, 21 of the stall space at the same angle of inclination as the associated stall side portions so as to form sidewall plate portions of the stall with continuous upwardly and outwardly directed side surfaces. The plate portion 23 extending along the side portion 21 of greater angular inclination provides a wheel hub support surface for one wheel 24 of a bicycle 22 occupying the stall space. More specifically, the hub support surface 23 extends downwardly from apex 15 below the height of hub portion 26 of wheel 24 above the base of the rack so that when the wheel within a stall is caused to lean toward the side portion 21 of greatest inclination, the projecting hub bolt end portion 25 of hub portion 26 engages and becomes supported by hub support surface 23. In this manner, the entire bicycle becomes supported in an upright position by the rack, and the support surface maintains the spokes and other vulnerable portions of the front wheel out of engagement with the stall frame members.

As shown in FIG. 2, the corresponding inclined side portions 21 of all stalls are at the same angle of inclination with respect to the vertical so that bicycles placed within such stalls will all lean in the same direction and all be engaged by the corresponding parallel and spaced-apart hub support surfaces 23 of the several stalls.

With one side of front wheel 24 of bicycle 22 leaning in the indicated direction in FIG. 2 against hub support surface 23 of the stall, a lower opposite side portion of the tire of wheel 24 engages lower side portion or base 20 of the stall at or near ground level, as for example at points 20a, 20b in FIGS. 1 and 2. Thus such points provide a side stop means which prevents the wheel hub portion from sliding sideways off hub-supporting surface 23.

As will be clear from FIG. 1, the rack framework also provides other stop functions. Front wheel 24 is prevented from rolling forward or backward by front and back roll stop means formed by the lower curved base portions 14 of the rack at the narrowest portion of the vee stall where the rod portions of adjacent stall sections 12 converge. Raised portions 23a, 23b at the front and rear edges, respectively, of hub-supporting surface 23 also contribute to this forward and backward roll stop function of the rack. In any case, the roll stops are positioned forwardly and rearwardly of a vertical plane normal to the hub support surface and bisecting a supported wheel through its rotational axis and extend to some extent in a direction transverse to the hub support surface.

Front wheel 24 is prevented from twisting out of a preset relationship to the bicycle frame, usually parallel to the frame as shown in FIG. 3, by another stop means which presses against a lower side portion of the front tire. This twist stop means is provided by the lower side portion 20 of the rack at point 20b forwardly of and below the wheel hub near ground level on the side of the stall opposite that of the direction of lean of the wheel. Alternatively a twist stop means is provided at a point 21b behind and below the midpoint of the wheel on the side of the vee stall in the direction of lean. In fact, both points 20b and 21b may coact to prevent twisting of the wheel from its preset relationship with the bicycle frame.

The rack described thus far is a so-called two-directional rack in that a bicycle can be placed in each adjacent stall 10, by pushing one wheel of one bicycle into one stall from one side of the rack and by pushing one wheel of another bicycle into the next adjacent stall from the opposite side of the rack in the manner shown in FIG. 3 with respect to bicycles 22a, 22b, 22c having front wheels 24a, 24b, 24c within adjacent stalls 10a, 10b, 10c, respectively. This type of rack enables close packing of bicycles into a small space without danger of damaging the bicycles. It also provides a neat appearance when the rack is full because all bicycles lean in the same direction.

One-Directional Rack

The two-directional open-frame rack of FIG. 1 can, through a slight modification, be converted to a one-directional rack with a pedestrian bench provided between adjacent one-directional stalls. Referring to FIG. 2, the one-directional rack would have the same basic form as the two-directional rack shown, except that every other stall 10 would be eliminated, and tubular or rod frame members would extend across every other stall as shown in phantom lines at 28. A wooden or other suitable bench would be mounted on the horizontally extending frame members 28 for use by pedestrians when the rack is not being used for bicycles.

FIG. 4 Form—Wall Rack

FIG. 4 shows a so-called wall rack 30. The rack includes a horizontally extending base portion 32, an outer vertical sidewall portion 33, and an inclined inner sidewall portion 34 extending upwardly from base 32 to converge with sidewall portion 33. Base 32 extends inwardly beyond inclined sidewall 34 toward a vertical building wall 35. The base is placed against the building so that inclined sidewall 34 of the rack and the vertical building wall 35 define a stall space 36, with one side of the stall formed by the building wall being vertical and the other side being inclined to provide a hub support surface 34.

The front wheel 24 of a bicycle 22 is placed within stall space 36 and the wheel's hub bolt 25 is leaned against the inclined stall surface 34. The lower ground-engaging end of the tire of wheel 24 engages the corner of the building wall 35 where it meets the ground surface or base 32. The frame of the bicycle is angled away from the wall, preferably at an angle of approximately 40 degrees. With this arrangement the building wall itself prevents the wheel hub from slipping from the inclined support surface 34. The vertical wall also provides a stop means for resisting twisting movement of the front wheel out of preset angular relationship with respect to the bicycle frame. The forces involved in parking a bicycle in this manner make the forward and backward roll stops previously described with respect to the FIG. 1 form of rack optional because the bicycle wedges itself between the wall and the rack when the frame is set at the optimum angle with respect to the wall as described. As the frame angle increases beyond 40 degrees, the bicycle becomes more nearly upright, the front wheel exerts less pressure against the wall, and the bicycle tends to roll forward or fall over.

Wall 35 should be at least about 3 inches high, although a 3-inch wall will not prevent the bicycle from falling in the direction of the wall. The ideal minimum height of the wall would be hub height to prevent the bicycle from falling in the direction of the wall.

The wall rack like the others described can be manufactured from sheet metal, plate or rod. It may also be made of concrete, plastic or other materials.

The wall rack provides for storage of bicycles in closely spaced relationship along a wall and in a manner so as to minimize the bicycles' intrusion into pedestrian space. In its simplest form, the wall rack is simply an inclined hub support surface supported by structural means at hub height and disposed about 7 inches, more or less, from a vertical wall. It illustrates the fact that in the simplest forms of the rack, a vee-shaped stall space is not necessary to support the bicycle.

FIG. 5 Form

FIG. 5 shows a two-directional open frame rack having a configuration similar to that of the rack of FIG. 1 when viewed from the front or rear as shown in FIG. 2.

However, the FIG. 5 form has a series of vee stalls 40 with adjacent stalls 40a, 40b offset forwardly and rearwardly from one another. All of stalls 40a are intended to receive bicycles inserted from the direction indicated by arrow 42 whereas all of vee stalls 40b are designed to receive bicycles inserted from the direction indicated by arrow 43. Vee stalls 40a have rear bases 44 which lie along a straight base line 45. However, the adjacent vee stalls 40b have rear bases 44a which lie along a straight base line 46 parallel to base line 45 but offset inwardly therefrom. A similar relationship exists between the front bases of the alternating vée stalls 40a and 40b on the opposite side of the rack. The bases of stalls 40a on the opposite side lie along a straight base line 47 parallel to the previously mentioned base lines, while the corresponding bases of vee stalls 40b lie along an outer base line 48 parallel to base line 47. The offset relationship of the adjacent vee stalls will also be apparent from FIG. 6.

Each stall section of inverted vee shape includes a cap 50 at its apex. The caps of adjacent stall sections include lock extensions 52, 53 projecting in opposite directions. Each lock extension 52, 53 has a vertical opening 54 therethrough so that each extension defines a lock loop through which a chain 55 can be passed, in the manner shown in FIG. 6. The lock extensions 52 projecting to the left in FIG. 6 are intended to be used with vee stalls 40a which are offset to the right in the same figure for use with bicycles inserted into stalls 40a from direction 42. Similarly, lock extensions 53 are designed to be used in conjunction with vee stalls 40b for use in locking bicycles inserted from direction 43. Thus front wheel 24d of the bicycle 22d is inserted from direction 42 into one of the vee stalls 40a. The bicycle chain 55a is threaded through the rear wheel, frame and front wheel of bicycle 22d and through the lock extension 52 and then padlocked to lock all three of the principal parts of such bicycle to the rack. In a similar manner, the bicycle 22e having front wheel 24e is inserted in one of the vee stalls 40b and chained to lock extension 53 by the chain 55b.

With the FIG. 5 type of rack, the bicycle is supported in the same manner as in the FIG. 1 form of rack. That is, each of the caps 50 for the stall sections has a portion which extends down one side of the stall section to define a wheel-supporting surface 56 at hub height to a bicycle wheel and against which the hub bolt of a bicycle wheel is leaned. As in the FIG. 1 form, the rack of FIG. 5 defines vee stalls wherein one side of the vee is at a greater angle of inclination to the vertical than the opposite side of the same vee stall, so that all bicycles placed within the vee stalls will lean in the same predetermined direction.

FIG. 7 Form

FIG. 7 shows a modified form of bike rack of the invention having an overall configuration substantially identical to that of the FIG. 1 form of rack. However, the FIG. 7 rack is composed of a series of precast concrete blocks 62 of generally pyramidal shape placed side by side to define a series of vee stalls 60. As in previous forms, one side of each vee stall is provided with a greater vertical angle of inclination than the other side of the vee stall. In the FIG. 7 form this is achieved by providing one side surface 62a of each block 62 with a greater vertical angle of inclination than the opposite side surface 62b. Each block 62 has a base 62c which extends outwardly at its four corners 63 in a manner such that when the blocks are placed together side by side, a gap 64 is formed between abutting corners 63 of adjacent blocks for receiving the front wheel of a bicycle. The abutting corners 63 of adjacent blocks provide the desired roll stops for preventing the bicycle wheel from rolling forward and backward from the stall space. The sidewalls of the blocks also provide the other desired stop features which prevent the wheel from twisting and from slipping sideways. Of course, each block 62 extends slightly above hub height to a bicycle wheel so that the surface 62a defines the necessary wheel support or leaning surface against which the wheel hub bolt is supported.

Blocks 62 are also provided with embedded lock loops 66 with the lock loops of adjacent blocks being on opposite faces of the blocks. Thus it will be apparent that the block-formed rack of FIG. 7 is a two-directional rack in that bicycles are inserted from opposite directions into adjacent vee stalls. The separate modular rack sections adapt the rack for expansion or contraction simply by adding or taking away blocks to meet the varying demands.

The FIG. 7 rack, like that of FIG. 1, can be adapted for use as a combination one-directional rack and bench with bench-type seating provided between adjacent vee stalls. This is done by eliminating every other vee stall and by casting the concrete blocks so that their bases are twice the length of each block shown in FIG. 7. In other words two adjacent blocks 62', 62" are cast as one with the vee space in between filled in as shown at 60a. The resulting block has a flat top 67 on which a bench 68 shown in phantom lines is installed.

FIG. 8 Form

FIG. 8 illustrates just how simple and lightweight a rack can be constructed using the same basic vee stall configuration as described with respect to the previously discussed embodiments. In FIG. 8 a single continuous length of metal rod or tubing includes a base frame portion 71 extending from a rear base line 72 to a parallel front base line 73 and then curves upwardly and inwardly to form a leg 74 at the desired angle of inclination of the vee stall side portion to an apex 75. At the apex the rod or tubing then curves back downwardly and outwardly along a rear leg 76 defining a side portion of the next vee stall 70 to the rear base line 72 and then curves to extend forwardly and form a second base portion 71a parallel to base portion 71. From front base line 73 the frame extends upwardly again along a second forward inclined leg 74a which is parallel to the first-mentioned leg 74 and forms the opposite side portion of vee stall 70. From here, the previously described sequence is repeated continuously until the desired number of vee stalls are formed. In the illustrated form of rack, the rear leg 76, base portion 71a and front leg 74a define a single vee stall 70. The apex 75 of the frame between vee stalls is capped by a suitable molded plastic cap member 78 designed to fit snugly over the apex of the metal frame. The cap has a side surface 79 extending at an inclination down the legs 74, 74a to define the desired wheel leaning or support surface of each vee stall at hub height to a bicycle wheel, indicated in phantom at 24.

The simple frame shown in FIG. 8 defines all of the necessary elements of a rack in accordance with the invention including a forward roll stop at 80 and another forward roll stop at the raised portion 79a of the wheel support surface 79. The base portion 71a of the framework provides a wheel stop against side slipping. A backward roll stop is provided by the raised portion 79b of wheel support surface 79. For a bicycle inserted into the stall space 70 from the direction indicated by arrow 84, the rack portions at 81, 82, in conjunction with that portion of leg 71a forward of the point at which the wheel 24 touches the ground, provide the desired stops against twisting of the wheel relative to the bicycle frame.

For a bicycle inserted from the direction indicated by arrow 85, the twist stop function is provided by that portion of leg 71a forward of the point at which the wheel 24 touches the ground.

FIG. 9 Form

Referring to FIG. 9 there is shown a modular form of the rack particularly adapted to be made from a molded synthetic plastic or other moldable material. The rack is made in a series of modular sections 90, each of which may be used singly to support one or two bicycles or in multiples placed side by side to form a series of stalls as indicated, for example, at 92 to support several bicycles. Each module 90 is of generally pyramidal or inverted vee form, including a pair of opposite spaced-apart, upwardly converging, flanged sidewall portions 94, 96 joined at their upper ends by a flat, generally horizontal flanged top wall portion 98 which can serve as a pedestrian seat when the rack is not supporting a bicycle. The lower ends of the sidewalls 94, 96 flare outwardly horizontally to define base portions 100, 102. Each base portion forms an upwardly opening tray or wheel well 104 for receiving the lower end of a bicycle wheel when a hub end portion is leaning against the hub support surface of the module.

Module 90 may be either symmetrical about a vertical center plane or formed with one sidewall 96 as shown at a greater angle of inclination to a vertical plane than the opposite sidewall 94. In the latter case when the modules are placed together in side-by-side relationship to form stalls and support several bicycles, all bicycles will lean in the same direction.

When sidewall 96 is at a greater inclination than sidewall 94, the upper portion of the upwardly and outwardly facing surface of such sidewall in the area 96a defines the hub support surface of the module. However, nevertheless both inclined sidewalls of a single module could be used to support a bicycle, in which case each module is capable of supporting a maximum of two bicycles.

As shown in phantom lines, the front wheel 106 of a bicycle has a hub portion 108 with opposite outwardly projecting hub bolt end portions 110 projecting outwardly beyond the opposite sides of the wheel. One of these projecting bolt portions on one side of the wheel is leaned against the hub support portion 96a of sidewall 96 while the lower end of the wheel is inserted within wheel well 104. Thus the opposite end walls 104a, 104b of wheel well 104 define the front and rear roll stops for the stand, and sidewall 104c of the well defines the side stop for the stand. Sidewall 104c also serves as a twist stop when the front wheel of the bicycle is supported by the stand. Each well 104 can be provided with appropriate drain holes (not shown) if desired to drain rainwater therefrom. Means (not shown) could also be provided to bolt adjacent modules together at their wheel wells if desired and also to anchor the trays to a pavement. Molded plastic modules as disclosed have the advantage of being lightweight and highly portable unless anchored as described.

FIG. 10 Form

FIGS. 10, 11 and 12 show a modular form of the rack or stand made of cast concrete. The stand is formed in modular sections 112 which may be placed in side-by-side relationship as shown in FIG. 10 to define a series of stalls 14. Such concrete racks have the advantage of being rugged and heavy and therefore not easily moved about even when not anchored in place.

Each module 112 includes a vertical sidewall portion 116 and an opposed laterally spaced vertically inclined sidewall portion 118 joined together by a flat horizontal top wall portion 120, all of considerable thickness. Inclined sidewall portion 118 includes an outwardly flaring base flange 122 provided with a recess defining a wheel well 124. Wheel well 124 includes downwardly and inwardly tapering opposite sidewalls 124a and a concave bottom wall 124b sloping upwardly at its opposite ends to intersect the top surface of flange 122 whereby the wheel well defines both front and rear roll stops, a side stop and a twist stop. A drain hole 126 extends from the lowermost portion of concave bottom wall 124b through the bottom of the flange to drain water from the well. An internally threaded bolt hole 128 extends inwardly from the center of the endwall of flange 122, and an aligned through hole 130 is provided in the lower vertical sidewall 116 so that several of the modules can be bolted together in side-by-side relationship with a lag bolt extending through hole 130 of one module and threaded into the threaded hole 128 in the flange endwall of an adjacent module.

Each concrete module also has means providing a lock loop passage 132 extending from a top opening 134 in top wall 120 through a built-up corner at the intersection between top wall 120 and inclined sidewall 118 to a side opening 136 in inclined sidewall 118. Such passage enables a chain-type bicycle lock to be inserted therethrough and about a bicycle wheel supported by leaning against the inclined sidewall 118 in the manner shown in FIG. 10.

Inclined sidewall 118 provides an outwardly and upwardly facing hub support surface in the area 138. A module as described is capable of supporting only one bicycle by leaning a hub end portion of one of its wheels against the inclined surface 138 because the outer surface of the opposite sidewall is vertical.

In use one wheel of a bicycle is inserted in wheel well 124 so that the bottom portion of the wheel rests within the well while a projecting hub bolt end portion 110 on one side of the wheel is leaned against the hub support surface 138 of inclined sidewall 118 to support the bicycle in a generally upright position. The flat top wall 120 of each module provides a pedestrian seat between each stall 114.

In FIG. 10 a bicycle 140 is shown with its front wheel 142 within a stall 114 between a pair of side-by-side modules 112. Its hub end portion leans against the outer surface 138 of inclined sidewall 118 while the bicycle is locked to one module by passing a chain-type lock through the lock loop of such module and securing the chain about the spokes and fork of the bicycle's front wheel.

From the foregoing it will be apparent that all of the described rack forms provide an inclined hub-leaning surface at hub height to a bicycle wheel. Some of the rack forms also provide, either alone or in conjunction with a vertical wall surface, a generally vee-shaped wheel stall open at both ends, with one side of the vee stall being at a greater vertical angle than the other side thereof and including the hub support surface. However, others of the rack forms are individual modules which may be used either singly so as not to define a stall but so as to nevertheless provide an inclined hub support surface or in multiples to define stalls for several bicycles. Preferably the racks are also provided with stops against forward and backward rolling of the wheel, twisting of a steerable wheel relative to the frame and side slipping of the wheel from its hub-leaning or support surface. Optionally the racks may be provided with additional embellishments such as benches, or instead of benches, planters or even lightposts. The racks may also be provided with various locking loop means.

Having illustrated and described the basic rack configuration of my invention and several embodiments and variations thereof, it should be apparent to those skilled in the art that the same permits of many modifications in arrangement, detail, materials and form. I claim as my invention all such modifications as come within the true spirit and scope of the following claims.

I claim:

1. A stand for supporting a bicycle in a generally upright position comprising:
structural means defining a generally planar continuous inclined sidewall portion of said stand providing a hub support surface, said hub support surface being directed upwardly and outwardly at an angle of no greater than about 30° to a vertical plane,
said structural means defining a ground-supported base for said stand and supporting and positioning said sidewall portion providing said hub support surface above said base at hub height to a bicycle wheel,
said structural means being so disposed as to provide sufficient clearance outwardly of said hub support surface and access forwardly and rearwardly of said surface so that one wheel of a bicycle can be positioned alongside said surface,
said inclined hub support surface being operable to support a bicycle in a near upright position by leaning one end only of a hub end portion only of one wheel only of said bicycle against said inclined hub support surface when both wheels are also ground-supported at their lower ends,
said hub support surface being of sufficient area such that said surface is at hub height to bicycle wheels of different diameters,
said structural means defining a set of front and rear roll stop means extending in a direction transverse to the plane of said hub support surface and being positioned fore and aft respectively of a vertical plane normal to the plane of said support surface and bisecting a wheel supported on said hub support surface along the rotational axis of the wheel to restrain the supported hub portion of the wheel from moving forwardly and rearwardly beyond the limits of said hub support surface through rolling movement of the supported wheel.

2. A stand according to claim 1 wherein said base defines a side stop means engageable with a lower sidewall portion of the tire of a wheel supported by leaning against said hub support surface for preventing side slipping movement of the lower portion of said wheel and thereby preventing slippage of the hub portion of a supported wheel downwardly beyond the limits of said hub support surface.

3. A stand according to claim 1 wherein said structural means supports plural said inclined hub support surfaces arranged in parallel side-by-side spaced-apart relationship with sufficient clearance space between adjacent said hub support surfaces to support a plurality of bicycles by leaning a hub portion of one wheel of each bicycle against a different one of said plural hub support surfaces, said base means defining a corresponding plural number of sets of front and rear roll stop means for restraining the supported hub portions of multiple supported bicycle wheels from moving forwardly and rearwardly beyond said hub support surfaces.

4. A stand according to claim 1 wherein said structural means defines a stall space between opposite sides of said structural means with said sidewall portion including said hub support surface lying along an upper portion of one side of said stall space, said stall space providing sufficient clearance from side to side thereof and front and rear access thereto such that when a projecting hub end portion on one side of a supported wheel is leaned against said support surface, the projecting hub end portion on the opposite side of said supported wheel clears the opposite side of said stall space to enable a wheel of a bicycle to be rolled into and out of said stall space and to be supported by leaning therein.

5. A stand according to claim 4 wherein one side of said stall space, including said inclined hub support surface, extends at a greater angle of inclination to the vertical than the opposite side of said stall space to induce a lean-supported bicycle to lean in a predetermined direction within said stall space.

6. A stand according to claim 4 wherein said base means at the lower fore and aft limits of said stall space defines said set of front and rear roll stop means, said roll stop means being engageable with the tire of a supported wheel fore and aft of said bisecting plane.

7. A stand according to claim 1 including a series of side-by-side stand modules forming multiple spaced-apart stall spaces, each said stand module being of generally inverted vee form, at least one side of the inverted vee of each said module including a said inclined hub support surface.

8. A stand according to claim 7 in which each said module is generally pyramidal in shape with the upper portion of one side of the pyramid defining one said inclined hub support surface.

9. A stand according to claim 7 wherein each said module of generally inverted vee form is horizontally flattened at its upper end to define a pedestrian seat spanning the distance between each adjacent stall space.

10. A stand according to claim 7 wherein said series of side-by-side stand modules are separate one from the other but positionable in side-by-side relationship to define said multiple stall spaces.

11. A stand according to claim 1 including means adjacent to said hub support surface defining a lock loop means for chaining a supported wheel to said stand.

12. A stand according to claim 1 of open metal framework construction, said framework defining a series of alternating generally vee-shaped stall spaces and generally inverted vee-shaped support portions between said spaces, a hub support plate positioned at one side of each said vee-shaped stall space at an upper portion thereof and extending in a direction fore and aft of said stall space to define said hub support surface, each inverted vee-shaped support portion of said series including a front inverted vee-shaped support portion and an aligned rear inverted vee-shaped support portion, the front support portions of said series lying in a first common plane and the rear support portions of said series lying in a second common plane and being spaced equidistant from said front support portions throughout the length of said series.

13. A stand according to claim 12 wherein adjacent said vee-shaped stall spaces defined by said open metal framework are offset alternately in a fore and aft direction from one another so that adjacent said stall spaces readily accommodate bicycles inserted into said adjacent stall spaces from opposite directions.

14. A stand according to claim 12 including a cap means capping the inverted vee-shaped support portions of said open framework and including said hub support plate along one side portion of said cap.

15. A stand according to claim 12 wherein said open metal framework comprises a single continuous metal rod-like member including in sequence a ground level frame portion extending generally horizontally lengthwise of a stall space, an upwardly and simultaneously rearwardly and inwardly extending frame portion defining one side of one stall space, a downwardly and simultaneously rearwardly and outwardly extending frame portion defining the opposite side of an adjacent said stall space, and a cap member capping the upper end portion of each inverted vee-shaped support portion formed by intersections of each said upwardly and rearwardly extending frame portion with its adjoining downwardly and rearwardly extending frame portion, each said cap member having a side plate portion defining one said inclined hub support surface.

16. A stand according to claim 1 wherein said structural means comprises a pair of upwardly converging continuous sidewall portions spaced apart at their lower ends and joined together at their upper ends by a top portion, at least one of said sidewall portions being inclined to a vertical plane and defining adjacent an upper end thereof said inclined hub support surface, the lower end of at least said inclined sidewall extending horizontally outwardly from said inclined sidewall portion and defining a base portion with an upwardly opening wheel well for receiving a lower wheel portion of a supported bicycle wheel, a hub end portion of which is adapted to lean against said hub support surface, fore and aft end portions of said wheel well defining said front and rear roll stop means, a sidewall portion of said wheel well spaced from said inclined sidewall portion defining a side stop means for the supported wheel.

17. A stand according to claim 16 formed of a molded synthetic plastic material.

18. A stand according to claim 17 wherein both said upwardly converging opposite sidewall portions are inclined to a vertical plane but in opposite directions and are joined at their upper ends by a generally flat horizontal top wall portion, the lower ends of both said sidewall portions flaring horizontally outwardly to define base portions with wheel wells whereby each said stand is capable of supporting by leaning two bicycles by leaning a projecting hub end portion of one wheel of each against each of opposite upwardly converging sidewall portions, each of said opposite sidewall portions defining one of said inclined hub support surfaces.

19. A stand according to claim 16 wherein said stand is formed of a cast concrete material.

20. A stand according to claim 19 wherein said inclined sidewall providing said hub support surface is inclined to a vertical plane and the opposite sidewall portion extends in a generally vertical plane, and means for interconnecting a series of said stands in side-by-side relationship to define a series of side-by-side stall spaces for supporting a multiplicity of bicycles.

21. A stand according to claim 19 including means defining a lock loop passage extending from an upper opening in said top wall portion through a corner between said top wall portion and said inclined sidewall portion to an opening in said inclined sidewall portion for receiving a chain-type locking means for locking a supported wheel of a bicycle to said stand.

22. A stand according to claim 16 wherein said top wall portion joining said converging sidewall portion is generally flat and horizontal to define a pedestrian seat.

23. A stand according to claim 1 wherein said base defines said set of front and rear roll stop means, said roll stop means being engageable with the tire of a supported bicycle wheel fore and aft of said bisecting plane, said base extending outwardly from a lower end of said sidewall portion and terminating at a free end, whereby said structural means comprises only said base and said sidewall portion including said hub support surface.

24. A stand according to claim 1 wherein said base defines said set of front and rear roll stop means, said roll stop means being engageable with the tire of a supported wheel fore and aft of said bisecting plane.

25. A bicycle stand comprising:
structural means including a sidewall portion defining at least one generally planar vertically inclined and upwardly directed wheel hub support surface of sufficient area to be at hub height to the wheels of bicycles having different hub heights,
said structural means providing an end of a hub portion of said wheels with access to said hub support surface,
a single said hub support surface being operable with a ground support surface for the wheels of the bicycle to support a bicycle by leaning one end only of a hub end portion of one wheel only of said bicycle against said vertically inclined hub support surface to support said one wheel in a vertically inclined position such that said vertically inclined hub support surface applies an inwardly directed compressive supporting force to said end of said hub portion in a direction generally along the rotational axis of said one wheel and at a slight angle to the ground support surface for said wheel,
said structural means including roll stop means engageable with said one wheel when leaning against said hub support surface for restraining forward end rearward rolling movement of said one wheel to prevent sliding movement of said end of said hub portion beyond the fore-and-aft limits of said hub support surface.

26. A rack according to claim 25 wherein a side portion of said structural means including said vertically inclined hub support surface together with an opposing side portion of said structural means define an upwardly diverging generally vee-shaped stall space open at both ends for receiving said one bicycle wheel.

27. A rack according to claim 25 wherein said side portions defining said vee-shaped stall space are formed by an open structural framework, said framework comprising a front framework portion and a rear framework portion, both said framework portions forming a series of continuous generally vee-shaped undulations to define a series of said stall spaces with said vee-shaped undulations alternating with inverted generally vee-shaped undulations and with said vee-shaped undulations of said front and rear framework portions being aligned fore and aft, said front and rear framework portions being joined together by said wheel support surfaces bounding adjacent said stall spaces, said vee-shaped undulations of said front framework portions of said series being aligned with one another lengthwise of said rack, and said vee-shaped undulations of said rear framework portions of said series being aligned with one another lengthwise of said rack.

28. A rack according to claim 26 wherein said side portions define continuous opposed sidewall surfaces forming the side boundaries of said stall space.

29. A method of supporting a bicycle in a generally upright position comprising:
leaning one projecting end of a hub portion of one wheel of the bicycle on one side of said wheel at an angle to the vertical of no greater than about 30° against one only vertically inclined hub support surface so as to apply a compressive supporting force against said hub end portion along the rotational axis of said wheel and at a slight angle to a ground support surface for the bicycle while (1) restraining a lower sidewall portion of the tire of said wheel on the opposite side of said wheel at or near ground level against sidewise slipping movement, (2) restraining a sidewall portion of the tire of said wheel at a point below and forwardly or rearwardly of the supported end of said wheel hub portion to prevent twisting movement of said wheel relative to the frame of said bicycle, and (3) restraining said wheel against forward and backward rolling movement.

30. In combination, a bicycle and a stand for supporting the bicycle in a generally upright position in a manner to minimize the possibility of damaging the bicycle,
said bicycle including a wheel having a hub including hub end portions projecting outwardly from opposite sides of said wheel,
said stand having a generally planar upwardly directed hub support surface extending at an inclination of no greater than about 30° to a vertical plane, said stand including structural means supporting said surface at the height of said hub portions of said wheel,
the outer end of one of said hub portions engaging said hub support surface to support said bicycle by leaning said hub portion against said surface such that said surface applies a supporting force to said bicycle along the rotational axis of said wheel,
said stand including roll stop means engageable with said wheel to restrain said wheel against forward and rearward rolling movement to retain said hub portion against said hub support surface.

31. A bicycle stand comprising:

a pair of horizontally spaced-apart continuous generally vertically extending sidewall portions joined together at their upper ends by an integral top wall portion,
at least one of said sidewall portions being inclined toward the other said sidewall portion at an angle to the vertical of no greater than about 30°,
said one inclined sidewall portion terminating at its lower end in a horizontally extending, ground-supported foot,
said other sidewall portion terminating at a ground-supported lower end,
said foot defining an upwardly open wheel well for supporting the lowermost tire portion of a bicycle wheel,
said wheel well being bounded at opposite ends and at a side opposite said one inclined sidewall portion by rim portions defining fore and aft roll stops and a side stop for restraining a bicycle wheel against rolling and side-slipping movement from said well,
said one inclined sidewall portion extending to a height above said wheel well such that a bicycle wheel supported at its lowermost end within said well will also be supported laterally by engagement of a hub end portion of said wheel by leaning against said one inclined sidewall portion so as to provide a two-point support for a bicycle in a near-upright position.

32. A bicycle stand comprising:
a pair of horizontally spaced-apart continuous generally vertically extending sidewall portions joined together at their upper ends by an integral top wall portion,
at least one of said sidewall portions being inclined toward the other said sidewall portion at an angle to the vertical of no greater than about 30°,
said one inclined sidewall portion terminating at its lower end in a horizontally extending, ground-supported foot,
said other sidewall portion terminating at a ground-supported lower end,
said foot defining an upwardly open wheel well for supporting the lowermost tire portion of a bicycle wheel,
said wheel well being bounded at opposite ends and at a side opposite said one inclined sidewall portion by rim portions defining fore and aft roll stops and a side stop for restraining a bicycle wheel against rolling and side-slipping movement from said well,
said one inclined sidewall portion extending to a height above said wheel well such that a bicycle wheel supported at its lowermost end within said well will also be supported laterally by engagement of a hub end portion of said wheel by leaning against said one inclined sidewall portion so as to provide a two-point support for a bicycle in a near-upright position,
said foot and a lower portion at said other sidewall portion including means for interconnecting similar bicycle stands in side-by-side relationship with the foot of one stand adjoining the other leg portion of an adjacent stand.

* * * * *